W. A. SWAN & W. A. HIGGS.
AIR PUMP.
APPLICATION FILED JUNE 10, 1916.

1,272,568.

Patented July 16, 1918.
2 SHEETS—SHEET 1.

Witnesses
Chas W. Stauffiger
Carl H. Butler

Inventor
William A. Higgs,
Willis A. Swan,
By Berthel & Berthel
Attorneys

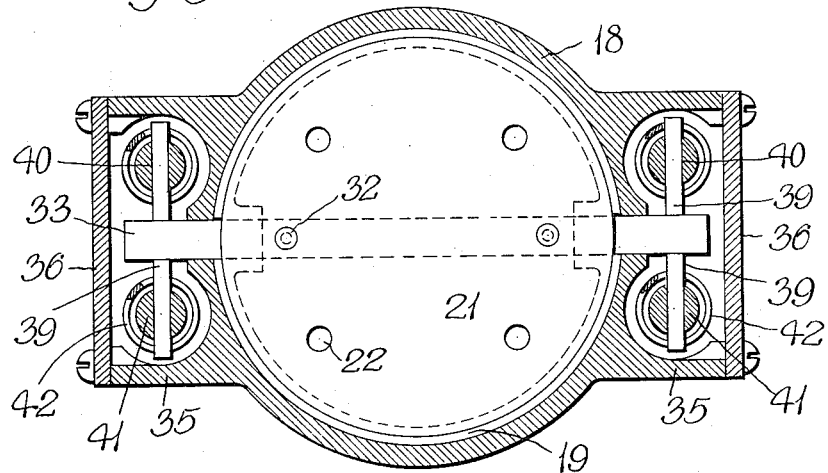
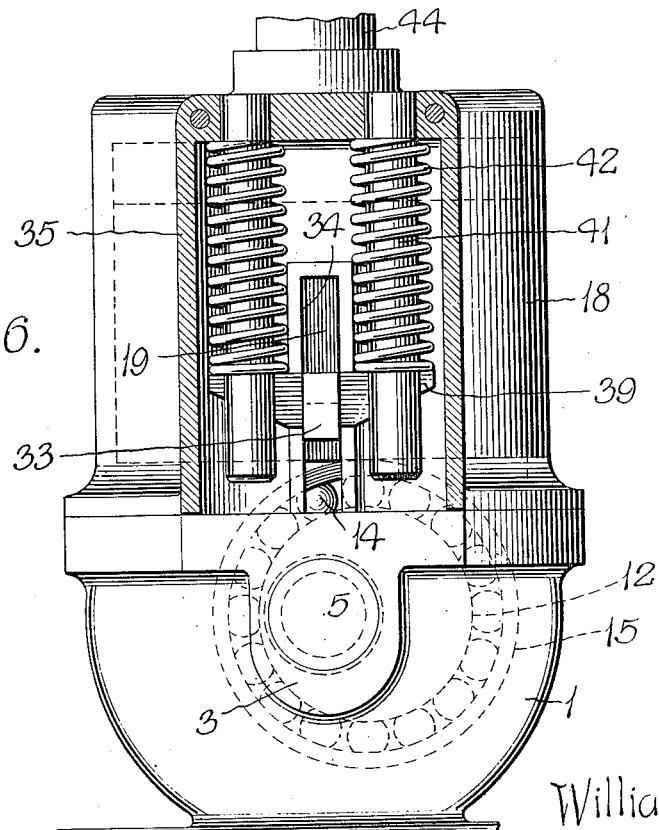

UNITED STATES PATENT OFFICE.

WILLIS A. SWAN AND WILLIAM A. HIGGS, OF DETROIT, MICHIGAN, ASSIGNORS TO THE SWAN MANUFACTURING COMPANY, A CORPORATION OF MICHIGAN.

AIR-PUMP.

1,272,568.  Specification of Letters Patent.  Patented July 16, 1918.

Application filed June 10, 1916. Serial No. 102,806.

*To all whom it may concern:*

Be it known that we, WILLIS A. SWAN and WILLIAM A. HIGGS, citizens of the United States of America, residing at Detroit, in the county of Wayne and State of Michigan, have invented certain new and useful Improvements in Air-Pumps, of which the following is a specification, reference being had therein to the accompanying drawings.

This invention relates to air pumps, and more particularly to a small pump especially designed as an accessory of an automobile, whereby the pump can be driven by the power plant of the automobile and utilized for the inflation of tires.

The primary object of our invention is to provide a compact pump wherein power is utilized for moving the piston of the pump in one direction and automatic means for moving the piston in an opposite direction, the former insuring compression of air and the latter an intake of air preparatory to compression, thus permitting of the pump being economically and expeditiously operated.

A further object of our invention is to provide an air pump wherein the parts are assembled with a view to reducing the cost of manufacture and at the same time retain the features by which safety, durability, simplicity and ease of assembling are secured, and with such ends in view, our invention resides in the novel construction, combination and arrangement of parts to be hereinafter specifically described and then claimed.

Reference will now be had to the drawings wherein—

Fig. 5 is a horizontal sectional view taken on the line V—V of Fig. 1, looking in the direction of the arrows associated with said figure; and Fig. 6 is a side elevation of the air pump, partly broken away and partly in section.

Figure 2:
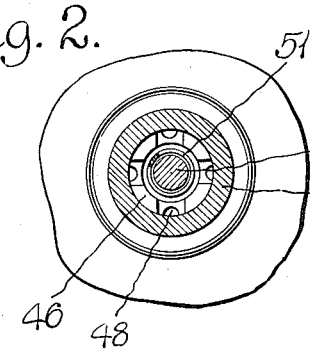
Fig. 2 is a horizontal sectional view taken on the line II—II of Fig. 1, illustrating a check valve.
Figure 3:
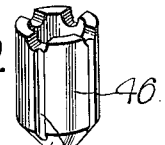
Fig. 3 is a perspective view of a detached check valve.
Figure 4:
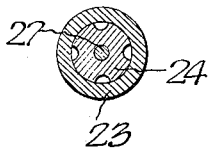
Fig. 4 is a horizontal sectional view taken on the line IV—IV of Fig. 1.
Figure 1:
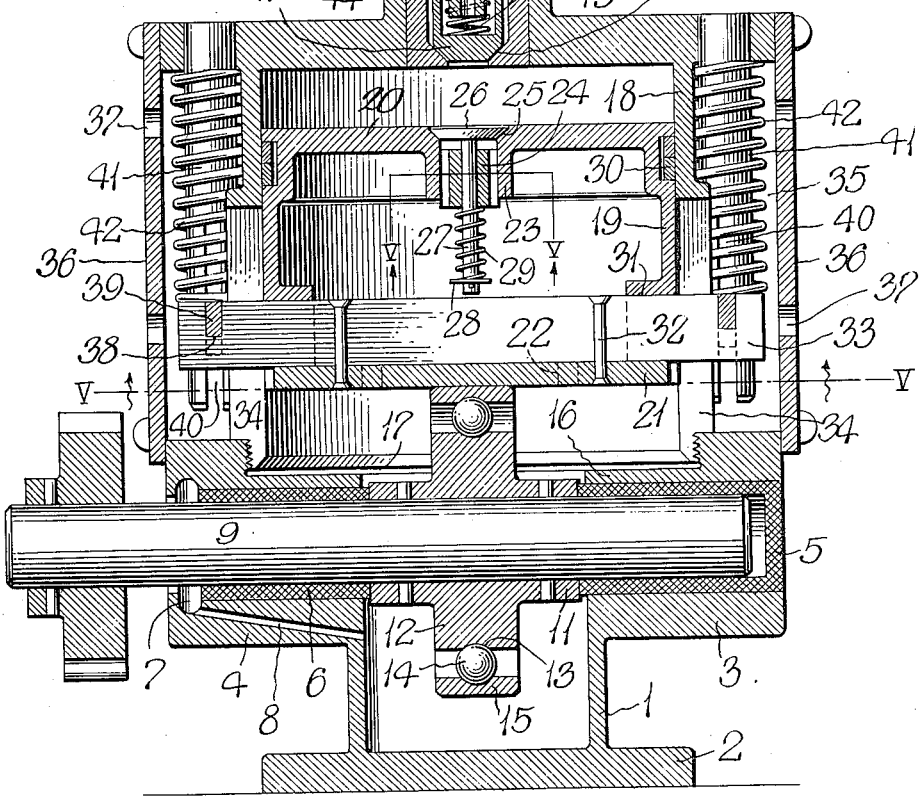
Figure 1 is a longitudinal sectional view of a pump in accordance with our invention.

In describing our invention by aid of the views above referred to, we desire to point out that the same are merely intended as illustrative of an example whereby our invention may be applied in practice, and we do not care to confine ourselves to the precise construction and arrangement of parts shown. The following description is therefore to be broadly construed as including substitute constructions and arrangement of parts which are the obvious equivalent of those to be hereinafter referred to.

In the drawing, the reference numeral 1 denotes a semi-cylindrical casing adapted to contain a lubricant, said casing having a suitable base or bed plate 2 adapted to be connected to a suitable support. The side walls of the casing 1 are formed with alining bearings 3 and 4 containing bushings 5 and 6 respectively. The bushing 5 has the outer end thereof closed and the bushing 6 terminates at an annular groove 7 in the bearing 4, communicating with the casing 1 through the medium of an angularly disposed drain port 8, which returns lubricant to said casing.

Journaled in the bushings 5 and 6 is a driven shaft 9 and mounted on an outer end of said shaft is a power transmission wheel 10 which can be driven by the engine of an automobile or from any suitable source of power.

Mounted upon the driven shaft 9, in the casing 1, are the hubs 11 of an eccentric 12, said eccentric having the peripheries thereof provided with a ball race 13 for anti-frictional balls 14 supporting an anti-frictional ring or annulus 15.

The top of the casing 1 is provided with a large horizontally disposed circular head 16 of which the bearings 3 form an integral part. The head 16 has a concentric opening 17 in communication with the casing 1 and providing clearance for the eccentric 12 and the anti-frictional ring 15 thereof. The walls of the opening 17 are screwthreaded to receive the inner end of a cylinder 18 and reciprocable in said cylinder is a hollow piston 19 having end walls 20 and 21. The end wall 21 has a series of apertures 22 establishing communication between the bore of the cylinder and the interior of the piston 19, and the end wall 20 of the piston has a central inwardly projecting boss 23 provided with a spider 24 and a valve seat 25. A check valve 26 normally engages the seat 25 and the stem 27 of said check valve extends through the spider 24 and is provided with a head 28. Between the head 28 and the spider 24 is a coiled retractile spring 29 encircling the valve stem, said spring holding the check valve normally seated but permitting of the same easily opening during a down-stroke of the piston 19.

Side walls of the hollow piston 19 have packing rings 30 of the usual and well known type, and said side walls are provided with diametrically opposed openings 31 contiguous to the apertured end wall 21 of the hollow piston. Extending through the openings 31 and riveted or otherwise connected to the end wall 21, as at 32, is a guide bar 33 having the ends thereof protruding through vertical slots 34 in walls of the cylinder 18. The slots 34 are in communication with spring housings 35 formed integral with diametrically opposed walls of the cylinder 18, said spring housings being closed by side plates 36 provided with air inlet ports 37.

The ends of the guide bar 33, within the spring housings 35, are notched, as at 38, to receive transversely disposed notched cross heads 39. The ends of the cross heads 39 extend into slots 40 in the lower ends of depending spring guides 41 mounted in the upper end of each of the spring housings 35. Encircling each of the guides 41, above the cross heads 39, are coiled compression springs placed under compression by an upstroke of the piston 19 and adapted to automatically lower the hollow piston as the eccentric 12 recedes. The springs 42 also retain the hollow piston normally in engagement with the anti-frictional ring or annulus 15 of the eccentric, consequently there is no lost motion between the operation of the piston and the eccentric.

The top of the cylinder 18 has a concentric opening 43 for a check valve housing 44 provided with a seat 45. Slidable in the valve housing 44 is a cup shaped check valve 46 provided with a conical end 47 to engage the seat 45 and close the lower ends of grooves 48 longitudinally disposed in the periphery of the valve. Extending into the cupped valve is a tubular spring guide 49 carried by an apertured plug 50 detachably mounted in the upper end of the valve housing 44. Encircling the guide 49 is a coiled compression spring 51 holding the check valve normally seated. The outer end of the plug 50 has a nipple 52 or provision whereby a hose may be connected to the pump as a conduit to supply air to tires for inflation purposes.

In operation, the down stroke of the hollow piston 19 produced by the springs 40 having been previously placed under tension by an upstroke of the piston, the check valve 26 is opened and air enters the upper end of the cylinder 18 where it is temporarily held by the upper check valve being seated. Since the springs 42 hold the hollow piston normally in engagement with the anti-frictional ring or annulus 15 of the eccentric 12, said eccentric eventually raises the hollow piston 19, placing the springs 42 under tension, closing the check valve 26, opening the upper check valve 46 and forcing air through the conduit or conduits connected to the nipple 52. During the upstroke of the hollow piston 19, air is drawn through the ports 37 of the side plates 36, the spring housings 35 into the lower end of the cylinder 18 and through the apertured end wall 21 of the piston, to be forced out of the hollow piston and the cylinder on the downstroke of the piston.

A pump in accordance with our invention possesses the following characteristics:—

First, that of having means in parallelism with the stroke of a piston or the bore of a cylinder for moving the piston to a retracted position by which air enters the cylinder to be compressed or forced therefrom.

Second, that of having a novel guide bar which prevents rotation of a piston in a cylinder and permits of power being applied to the piston from points exteriorly of a cylinder.

Third, that of having an eccentrically actuated piston with the eccentric partially immersed in a lubricant thereby insuring a non-frictional actuation of the piston by the eccentric, and Fourth, that of compactness and configuration which permit of the air pump being located in a comparatively small space and operated without danger of interference by foreign matter.

What we claim is:—

1. An air pump comprising a casing, a driven eccentric in said casing, a cylinder on said casing, a hollow piston reciprocable in said cylinder in one direction by said eccentric, said cylinder having air inlet ports therein communicating with said hollow piston, a check valve at the outer end of said piston, a check valve at the outer end of said cylinder, housings at the sides of said cylinder, a guide bar carried by said hollow piston and extending into said housings, and means in said housings maintaining said piston normally in engagement with said eccentric and adapted to move said piston in a direction opposite that moved by said eccentric.

2. An air pump comprising a casing, a cylinder on said casing, a hollow piston reciprocable in said cylinder, said cylinder having air inlet ports therein communicating with said hollow piston, a check valve at the outer end of said piston, a check valve at the outer end of said cylinder, housings at the sides of said cylinder, a guide bar carried by said hollow piston and extending into the housings, means in said housings adapted to move said hollow piston in one direction in said cylinder, and means in said casing engaging said hollow piston adapted to move said piston in an opposite direction in said cylinder.

3. An air pump comprising a casing, a driven eccentric in said casing, a cylinder on said casing, a hollow piston reciprocable in said cylinder in one direction by said eccentric, said cylinder having air inlet ports therein communicating with said hollow piston, a check valve at the outer end of said piston, a check valve at the outer end of said cylinder, housings at the sides of said cylinder, a guide bar carried by said hollow piston, and extending into said housings, cross heads carried by the ends of said guide bar, and springs in said housings engaging the ends of said cross heads adapted to maintain said hollow piston normally in engagement with said eccentric and move said hollow piston in an opposite direction to that which it is moved by said eccentric.

In testimony whereof we affix our signatures in presence of two witnesses.

WILLIS A. SWAN.
WILLIAM A. HIGGS.

Witnesses:
ANNA M. DORR,
KARL H. BUTLER.